April 29, 1941.   A. KOVALOVSKY ET AL   2,240,075
FISHING REEL
Filed June 11, 1937   2 Sheets-Sheet 1
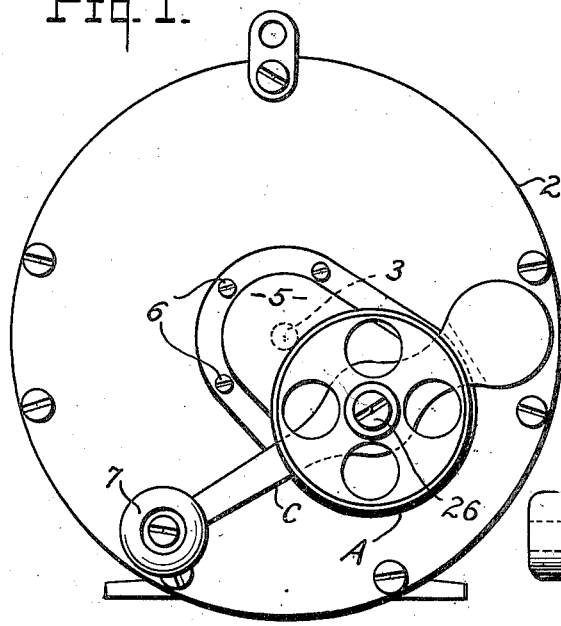
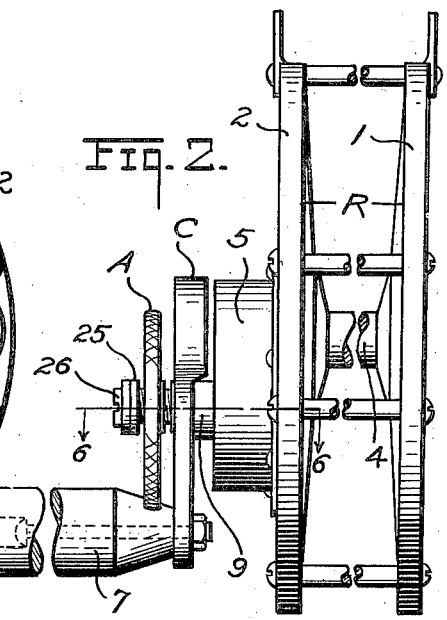
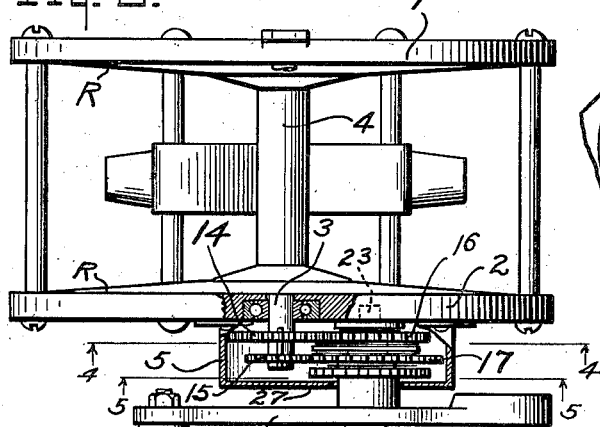
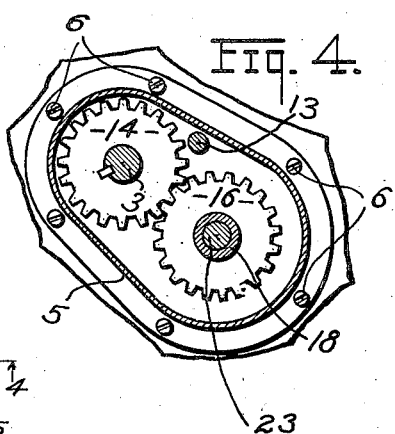
Inventor
Arthur Kovalovsky & Oscar Kovalovsky
Arthur L. Mack
Attorney April 29, 1941.  A. KOVALOVSKY ET AL  2,240,075
FISHING REEL
Filed June 11, 1937   2 Sheets-Sheet 2
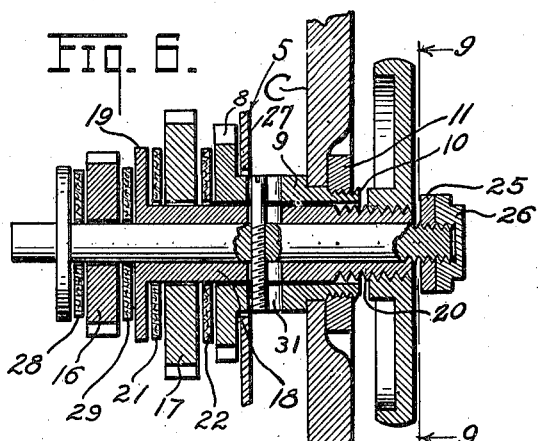
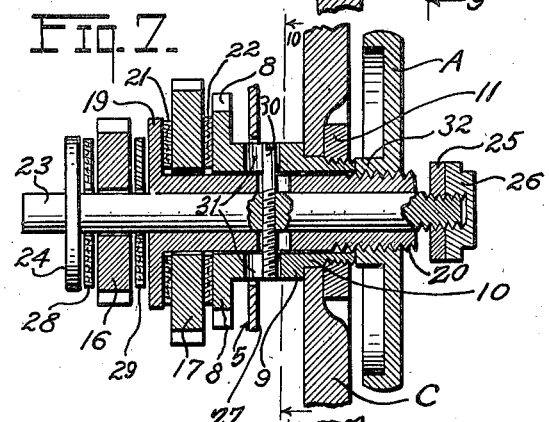
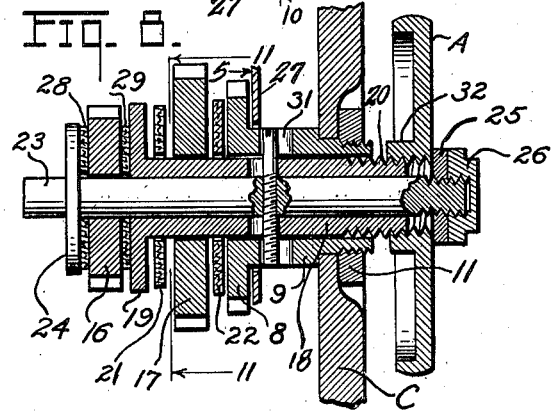
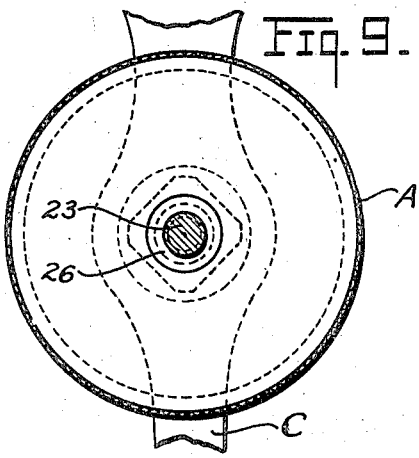
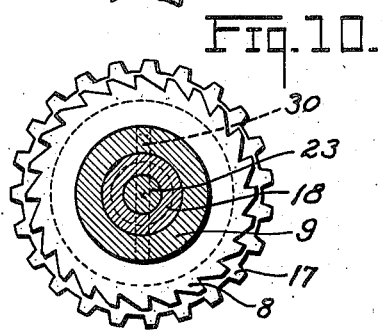
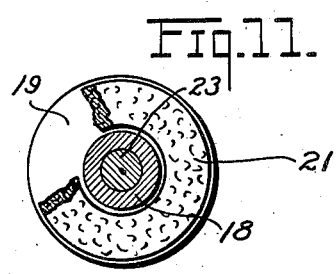
Inventor
Arthur Kovalovsky and Oscar Kovalovsky
Attorney.

Patented Apr. 29, 1941

2,240,075

UNITED STATES PATENT OFFICE 2,240,075

FISHING REEL

Arthur Kovalovsky and Oscar Kovalovsky, Los Angeles, Calif.

Application June 11, 1937, Serial No. 147,726

7 Claims. (Cl. 242—84.5)

This invention relates in general to fishing reels and more particularly to a transmission mechanism applicable to fishing reels adapted for deep sea fishing, wherein a dual transmission ratio is provided between the spindle of a reel and the crank by means of which the reel is operated.

A principal object of this invention is to provide in connection with a train of gears operatively connecting the reel spindle and the crank spindle whereby a 1:1 and a 2:1 gear ratio may be established selectively by a fisherman, a suitable manually operable means externally of the reel and preferably externally of the crank for quickly and effectively changing the gear ratios without unmeshing or meshing any of the transmission gears. We prefer to accomplish this result as by means of frictional plates or elements interposed between gears as for instance, on the crank spindle and relatively stationary members, so that a quick manual adjustment in one of two directions will change the driving ratio between the crank and the reel.

Our invention contemplates a structure which is readily applicable to new or used reels and which is also effective for providing a necessary drag as when the line on the reel is being played out and by means of which certain desirable slippage is permitted while the line is being reeled in, as when a fish is on the line.

Finally, it is our purpose to provide an economical and efficient mechanism for the purposes described, which will at all times be under the ready control of the operator and will meet different conditions of use such as are not usually provided in a conventional reel.

Other objects of our invention may appear in the description hereinafter following.

We have shown a preferred form of our invention in the accompanying drawings, in which Fig. 1 is an end view of a fishing reel externally of the crank and embodying our improvements;

Fig. 2 is a side elevation of the same;

Fig. 3 is a top view of the same partially in section so as to expose the transmission means;

Figs. 4 and 5 are detailed cross sectional views on line 4—4 and 5—5 respectively, of Fig. 3.

Figs. 6, 7 and 8 are cross sectional views of the transmission means on line 6—6 of Fig. 2, and show the elements of the transmission in a neutral position, in a position for effecting a 2:1 drive and in a position for effecting a 1:1 drive respectively;

Fig. 9 is a fragmentary view of the operating member by means of which the gear ratios are changed as seen on line 9—9 of Fig. 6;

Fig. 10 is a cross sectional view of a transmission means as seen on line 10—10 of Fig. 7; and Fig. 11 is a sectional view of the same on line 11—11 of Fig. 8.

In the consideration of this invention it will be understood that any suitable form of fishing reel may be employed in connection with our aforesaid improvements. Conventional reels are provided with suitable frame members as at 1 and 2, on which a reel R is mounted as by means of a suitable spindle 3 in said frame members for rotation so as to enable a fisherman to unwind a line from and to wind the same on the core 4 of the reel at will.

We provide externally of one of the frame members as at 2, a suitable transmission case 5 affixed to the frame 2 as by screws 6—6. In the form of device shown a crank C having a handle 7 is operatively mounted on an axis offset from the axis of the spindle 3, so as to drive the spindle 3 at a selected speed, said handle being operatively supported, as hereinafter described and as particularly shown in Figs. 6, 7 and 8.

The body of the crank C carries a ratchet 8 having a hub 9 shouldered so as to space the ratchet substantially from the handle and a reduced portion 10 extends from the hub of the ratchet through the crank C and has its end portion threaded so as to receive a lock nut 11 by means of which the handle and ratchet are tightly locked together. The ratchet 8 is engaged by a pawl 12 pivotally held at a point 13 on the wall of the transmission case 5 or on the face of a rear frame member 2, as may be desired, and is spring held so that the pawl is constantly engaged with the ratchet for preventing the reverse rotation of the ratchet and the crank C. The spindle 3 has gears 14 and 15 keyed to the extended end thereof, which, respectively, mesh with gears 16 and 17 supported coaxially with and on the handle, as shown for instance, in Fig. 6.

It will be observed that gears 14 and 16 are of uniform size and serve to provide a 1:1 ratio between the crank C and the spindle 3, while gears 15 and 17 are of different size and serve to provide a 2:1 or any other desired ratio between the spindle 3 and the crank C. It will be noted that the two trains of gears just described are in constant mesh and, therefore, to change the gear ratio between the crank and the spindle, it is unnecessary to shift gears. A speed changing ratio, however, between the reel spindle and the crank is accomplished by means of the mechanism shown in Figs. 6, 7 and 8, to which reference is now made.

This mechanism includes an elongated sleeve 18 which has its inner end provided with a circular plate or head 19 and its outer end provided externally of the handle with a threaded portion 20 adapted to receive an adjusting wheel A. It will be observed that the sleeve 18 extends loosely through gear 17 and through the ratchet 8 and its hub 9 and also through a pair of friction plates 21 and 22 disposed on opposite sides of the gear 17. The plate 22 is confined between gear 17 and ratchet 8, while the plate 21 is confined between the head 19 and the inner side of gear 17. The handle spindle 23 extends through gear 16 and sleeve 18 and is provided on its inner end with a plate 24 and on its outer end with lock nuts 25 and 26, the inner end of the spindle 23 being suitably journaled in the frame 2 of the reel and the hub 9 of ratchet 8 being suitably journaled in the front wall 27 of transmission case 5, as shown in Fig. 3, for operatively supporting the transmission means shown in Figs. 6, 7 and 8.

A pair of friction plates 28 and 29 are provided on opposite sides of gear 16, the plate 28 being confined between plate 24 and the inner side of gear 16, while the friction plate 29 is confined between the inner surface of plate 19 and the outer surface of gear 16. The ratchet 8, sleeve 18, spindle 23 are keyed together as by means of a pin 30 which has its ends projecting into elongated slots 31 of hub 9 of said ratchet, and similar slots in the sleeve 18 so that relative adjustment of the ratchet, rod and sleeve may be effected by adjusting the wheel A in order to selectively change the speed ratio of the reel. This adjustment is accomplished as follows:

From a neutral position of all of the elements of the transmission as shown in Fig. 6, in which position all of said elements are loose, the turning of the wheel A forwardly, that is in a clockwise direction as seen in Fig. 1, will draw the sleeve 18 outwardly through the handle and cause the hub 32 of wheel A to abut the outer end of the ratchet hub 9 and at the same time, cause the plate 19 on the inner end of said sleeve, to frictionally engage the friction plate 21, while the companion friction plate 22 will be frictionally held between gear 17 and the inner side of ratchet 8. Thus the gear 17 is frictionally held for driving its companion gear 15 on spindle 3, and the spindle at a 2:1 ratio, or at such other driving ratio as may be desired. In the meantime, however, the gear 16 and its friction plates 28 and 29 are free on the spindle 23.

When adjusting wheel A is moved in a counterclockwise direction, as seen in Fig. 1, the outer face of said wheel will abut the innermost lock nut 25 and in its movement will retract the sleeve 18 inwardly while moving the spindle 23 outwardly, thereby frictionally connecting the plate 24, gear 16 and plate 19 with the frictional elements 28 and 29, as shown in Fig. 8, and at the same time relieving the friction between gear 17 and its associated elements. Hence under such condition the drive from gear 16 to gear 14 will become operative while the drive between gears 15 and 17 will become inoperative and the speed ratio of the reel and crank will be 1:1 or as may be otherwise desired. It is seen that the ratchet 8 being on the inner side of the wall 27 will engage said wall to prevent an outward movement of the gear assembly sufficient to disengage gears 16 and 17 from the gears 14 and 15, whereas the plate 24 engaging the member 2 serves the same purpose as to inward movement of any of the gears and associated elements.

It will be understood that in a reel of the general construction illustrated and described herein, the crank is prevented from rotation when the line is being played out but is permitted to rotate freely when the line is being reeled in. The reel, however, is so constructed that the friction plates of the transmission as shown in Figs. 6, 7 and 8, are effective for placing a drag on the reel when the line is being played out, through the slippage of the gear train with a desired amount of friction placed thereon, by adjusting the wheel A to a suitable point. Also when the line is being reeled in, as when a fish is on the line, a certain amount of slippage may be permitted so as to not render the line too taut and cause it to break. Under certain conditions, however, it is apparent that by tightening the wheel A the transmission may be locked against slippage.

From the foregoing description of our invention and by reference to the accompanying drawings, it will be readily apparent that we have provided a simple and effective dual speed transmission device for fishing reels, which is capable of quick adjustment for changing the speed without meshing or unmeshing any of its gears, and that although we have shown a practical and preferable form of the device, we deem it possible to modify the same within the scope of the appended claims, without departing from the spirit of our invention.

We claim:

1. In a fishing reel: a reel, a crank for rotating said reel, a plurality of constantly meshed gears connecting said reel and said crank for establishing at least two gear ratios therebetween, means for preventing rotation of the crank in one direction and manually adjustable means independent of said crank and operable for selectively changing the gear ratios while said gears and crank are in motion and including friction clutch means also serving as a brake for controlling the rotation of the reel.

2. In a fishing reel: a reel, a crank for rotating said reel, a plurality of constantly meshed gears connecting said reel and said crank for establishing at least two gear ratios therebetween, means for preventing rotation of the crank in one direction and manually adjustable means for selectively changing the gear ratios, said manually adjustable means including an operating member externally of said crank, and frictional elements associated with certain of said gears, and means for selectively rendering said frictional elements operable to grip one or another of said gears upon the operation of said operating member.

3. In a fishing reel: a reel, a crank for rotating said reel, means for preventing rotation of the crank in one direction a plurality of constantly meshed gears connecting said reel and said crank for establishing at least two gear ratios therebetween, and manually adjustable means for selectively changing the gear ratios, including a plurality of frictional elements associated with certain of said gears, an operating member independent of said crank, and means cooperating with and controlled by said operating member for selectively rendering said frictional elements effective in pairs for driving said reel at different speeds and for braking the reel.

4. In a fishing reel: a rotatable reel, a crank for operating said reel, means for preventing the rotation of the crank in one direction, a transmission for said reel including at least a pair of driven gears associated with said reel and driving gears associated with said crank and constantly meshed with said driven gears, and manually operable means arranged for adjustment independently of said crank so as to selectively disconnect said crank from driving relationship with said reel or to simultaneously disconnect one set of gears and to connect another set of gears whereby said reel may be operated at different speeds, said manually operable means including a handle disposed for manual movement at a point outwardly spaced from said crank and friction elements interposed between certain of said gears for service as a clutch and as a brake.

5. In a fishing reel: a frame, a reel rotatably held thereon, a crank for said reel, gears operatively connecting said crank and said reel, and manually operable means for establishing at least two gear ratios between said crank and said reel without shifting any of said gearing out of mesh, including friction elements cooperating with certain of said gears for service as a clutch and as a brake, means for preventing the rotation of said crank in but one direction while said reel rotates in either direction.

6. In a fishing reel, a frame, a reel rotatable thereon, a gear housing on said frame, a ratchet wheel in said housing, a tubular hub on which said ratchet is fixed and which extends thru the wall of said housing, a crank fixed to said hub, a sleeve axially adjustable in said hub, a spindle axially adjustable in said sleeve, coaxial driving gears freely rotatable on said sleeve and spindle, driven gears fixed to said reel for maintaining a constant mesh with said driving gears, a drive pin carried by said spindle, said sleeve and hub having slots in which said pin is slidably engaged for affording relative longitudinal adjustment of said sleeve and spindle while maintaining a driving connection with said hub, plate members fixed on said sleeve and said spindle, a plurality of friction drive elements mounted on said spindle and sleeve between certain of said gears and said plate members for establishing frictional driving connection therebetween and means mounted on the outer ends of said spindle and sleeve for effecting relative adjustment thereof.

7. In a fishing reel, a frame, a reel rotatable thereon, a gear housing on said frame, a ratchet wheel in said housing, a tubular hub on which said ratchet is fixed and which extends thru the wall of said housing, a crank fixed to said hub, a sleeve axially adjustable in said hub, a spindle axially adjustable in said sleeve, coaxial driving gears freely rotatable on said sleeve and spindle, driven gears fixed to said reel for maintaining a constant mesh with said driving gears, a drive pin carried by said spindle, said sleeve and hub having slots in which said pin is slidably engaged for affording relative longitudinal adjustment of said sleeve and spindle while maintaining a driving connection with said hub, plate members fixed on said sleeve and said spindle, a plurality of friction drive elements mounted on said spindle and sleeve between certain of said gears and said plate members for establishing frictional driving connection therebetween, and means mounted on the outer ends of said spindle and sleeve for effecting relative adjustment thereof, said means being disposed outwardly of said crank.

ARTHUR KOVALOVSKY.
OSCAR KOVALOVSKY.